United States Patent

Andrä et al.

[11] Patent Number: 6,068,555
[45] Date of Patent: May 30, 2000

[54] VIBRATION DAMPING, TORSIONALLY ELASTIC SHAFT COUPLING, ESPECIALLY FOR A MOTOR VEHICLE POWER TRAIN

[75] Inventors: Rainer Andrä, Limburg; Wilfried Schneider, Waldkraiburg, both of Germany

[73] Assignee: SGF Suddeutsche Gelenkscheibenfabrik GmbH & Co. KG, Germany

[21] Appl. No.: 09/011,964

[22] PCT Filed: Aug. 20, 1996

[86] PCT No.: PCT/EP96/03664

§ 371 Date: Feb. 20, 1998

§ 102(e) Date: Feb. 20, 1998

[87] PCT Pub. No.: WO97/08472

PCT Pub. Date: Mar. 6, 1997

[30] Foreign Application Priority Data

Aug. 24, 1995 [DE] Germany .......................... 195 31 201

[51] Int. Cl.[7] ..................................................... F16D 3/76
[52] U.S. Cl. ................... 464/93; 464/87; 464/89; 464/180
[58] Field of Search ................... 464/87, 89, 92, 464/93, 180, 181

[56] References Cited

U.S. PATENT DOCUMENTS

| | | | |
|---|---|---|---|
| 3,848,431 | 11/1974 | Takahashi et al. | 464/89 |
| 4,114,472 | 9/1978 | Hornig et al. | 74/574 X |
| 4,257,242 | 3/1981 | Domer et al. | 64/14 X |
| 4,467,753 | 8/1984 | Lange | 123/195 X |
| 4,516,956 | 5/1985 | Staiert | 464/89 |
| 4,763,767 | 8/1988 | Lanzarini et al. | 192/106.2 X |
| 5,152,718 | 10/1992 | Confer . | |
| 5,195,625 | 3/1993 | Chang et al. | 192/84 X |
| 5,704,839 | 1/1998 | Michael et al. | 464/89 |

FOREIGN PATENT DOCUMENTS

| | | | |
|---|---|---|---|
| 0245668 | 2/1988 | European Pat. Off. . | |
| 0463462 | 1/1992 | European Pat. Off. . | |
| 2331713 | 6/1977 | France . | |
| 2448068 | 8/1980 | France . | |
| 1266578 | 4/1968 | Germany . | |
| 2534684 | 3/1977 | Germany . | |
| 2709959 | 9/1978 | Germany | 464/93 |
| 2710593 | 9/1978 | Germany | 464/89 |
| 3732705 | 4/1989 | Germany | 464/87 |
| 3942432 | 5/1991 | Germany . | |
| 227016 | 11/1985 | Japan | 464/89 |
| 228126 | 10/1986 | Japan | 464/93 |
| 1353418 | 5/1974 | United Kingdom | 464/87 |
| 2079403 | 1/1982 | United Kingdom | 464/89 |

*Primary Examiner*—Peter M. Cuomo
*Assistant Examiner*—Brian H. Buck
*Attorney, Agent, or Firm*—Webb Ziesenheim Lodgson Orkin & Hanson, P.C.

[57] ABSTRACT

A flexible disc is arranged between first and second flanges each designed to be secured to a shaft, the flexible disc being alternately fixed at angular spacings to one each of the flanges. A torsional vibration suppressor is associated with one of the two flanges and has a suppressor collar integrally formed with the flange, a gyrating mass, and a rubber spring suspension system which is secured by vulcanization to the suppressor collar and the gyrating mass. A centering device having a centering collar formed integrally with the flange, a centering body rigidly connected to the other flange, and a rubber spring suspension system secured by vulcanization to the centering collar, is provided for mutually centering the two shafts. This obviates the need for expensive fits or matches and facilitates the assembly of the shaft coupling.

5 Claims, 2 Drawing Sheets

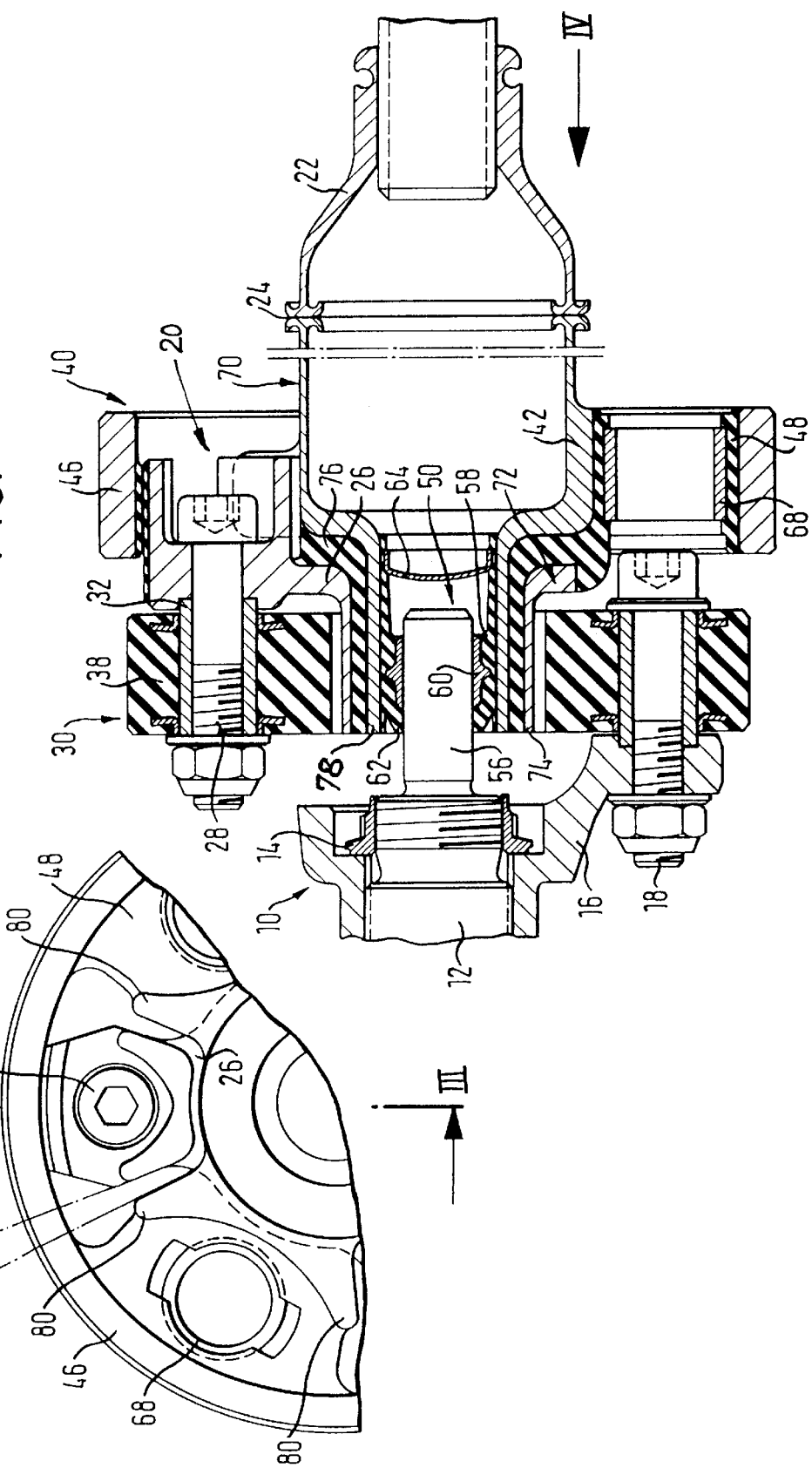

VIBRATION DAMPING, TORSIONALLY ELASTIC SHAFT COUPLING, ESPECIALLY FOR A MOTOR VEHICLE POWER TRAIN

BACKGROUND OF THE INVENTION

The invention relates to a shaft coupling.

Shaft couplings of this kind are known from FR-A-2 331 713.

It is the object of the invention to design a vibration damping, torsionally elastic shaft coupling such that it will be capable of decoupling vibrations of small amplitude at low torques in a power train.

SUMMARY OF THE INVENTION

The object is met, in accordance with the invention, by the shaft coupling of the invention having first and second flanges designed to be secured to a shaft and a flexible disc disposed between the two flanges and alternately fixed at angular spacings to one of the flanges. The shaft coupling further includes a torsional vibration suppressor having a suppressor collar rigidly connected to the second flange, a gyrating mass and a rubber spring suspension system adhering to the suppressor collar and the gyrating mass. The shaft coupling further includes a centering device having a centering collar rigidly connected to the second flange, a centering body rigidly connected to the first flange and a rubber spring suspension system adhering to the centering collar. The second flange is divided into a primary portion and a secondary portion interconnected by a rubber spring suspension system. The primary portion is designed to be secured to the associated shaft and comprises at least one of the collars. The secondary portion is connected through the flexible disc to the first flange.

BRIEF DESCRIPTION OF THE DRAWINGS

Embodiments of the invention will be described below with reference to diagrammatic drawings in which:

FIG. 3 shows a second embodiment of a shaft coupling according to the invention in sectional elevation III—III of FIG. 4; and FIG. 4 is the front end view in the direction of arrow IV of FIG. 3.

DESCRIPTION OF THE PREFERRED EMBODIMENTS

Figure 1:
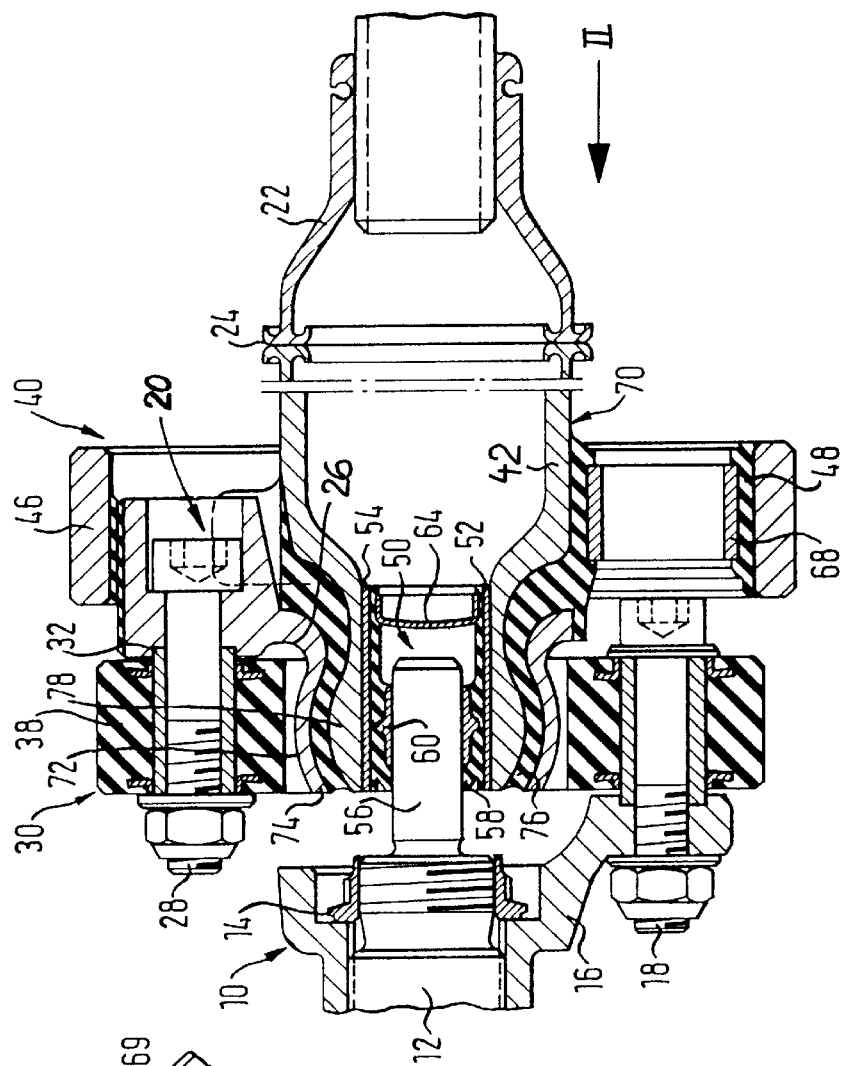
FIG. 1 shows a first embodiment of a shaft coupling according to the invention in sectional elevation I—I of FIG. 2.

Each of the shaft couplings illustrated is intended to be used as part of a power train in a motor vehicle, especially to be installed between a clutch and a differential gear.

As is well-known such shaft couplings have a first flange 10 slipped on a first shaft 12, secured to it by a nut 14, as well as a plurality of arms 16, normally three, to receive a threaded bolt 18 each. Opposite the first flange 10, and at an axial spacing from it, there is a second flange 20 adapted to be fastened to a second shaft 22, such as a tubular semishaft of the kind shown in FIGS. 1 and 3, by a friction weld 24 for example. The second flange 20 likewise comprises three arms 26, each to take up a threaded bolt 28.

A customary flexible disc 30, comprising six paraxial bushings 32 to house one each of the threaded bolts 18 and 28, is positioned between the two flanges 10 and 20. The bushings 32 may be surrounded directly by yarn windings which wrap them in pairs or they may be embedded in relatively soft rubber 34 and each be encircled by an external bushing 36. The external bushings in turn may be wrapped in pairs by yarn windings. Other than that the flexible disc 30 is made of rubber 38.

A suppressor collar 42 (FIG. 3) of a torsional vibration suppressor 40 is formed at the second flange 20. The torsional vibration suppressor 40 includes an annular gyrating mass 46 surrounding the suppressor collar 42 to which it is fixed in conventional manner by a vulcanized rubber spring suspension system 48.

The mutual centering of the two shafts offered by the flexible disc 30 alone, which interconnects the two shafts 12 and 22, is not sufficiently accurate for all purposes. To avoid the necessity of having to obtain centering by means of expensive bearing means for the two shafts 12 and 22, a centering device 50 is provided. As shown in FIG. 1, the centering device 50 comprises a centering sleeve 52 pressed into a cylindrical seat 54 formed in the second flange 20, the sleeve also is radially spaced from and surrounds a pin-shaped centering body 56 formed at the shaft 12. A rubber spring suspension system 58 is secured to the inside wall of the centering sleeve 52, especially by vulcanization. It encloses a bushing 60 made of self-lubricating material, such as sintered metal which guides the centering body 56 for axial displacement. The rubber spring suspension system 58 is formed with a sealing lip 62 (FIG. 3) which faces the first flange 10 and establishes a seal with the centering body 56. Near the opposite end of the centering device 50, the centering sleeve 52 is closed by a pressed-in cover 64. The space thus sealed off within the centering sleeve 52 is filled with lubricant.

Spacers 68, for example in the form of paraxial sleeves, may be embedded in the rubber spring suspension system 48 of the torsional vibration suppressor 40. They serve to minimize radial deflections of the gyrating mass 46 with respect to the suppressor collar 42 and influence the torsional vibration characteristics of the suppressor in a desirable manner. To accomplish the latter, cavities 69 may be provided in the rubber spring suspension system 48 adjacent the spacers 68 in circumferential direction of the torsional vibration suppressor 40.

Figure 2:
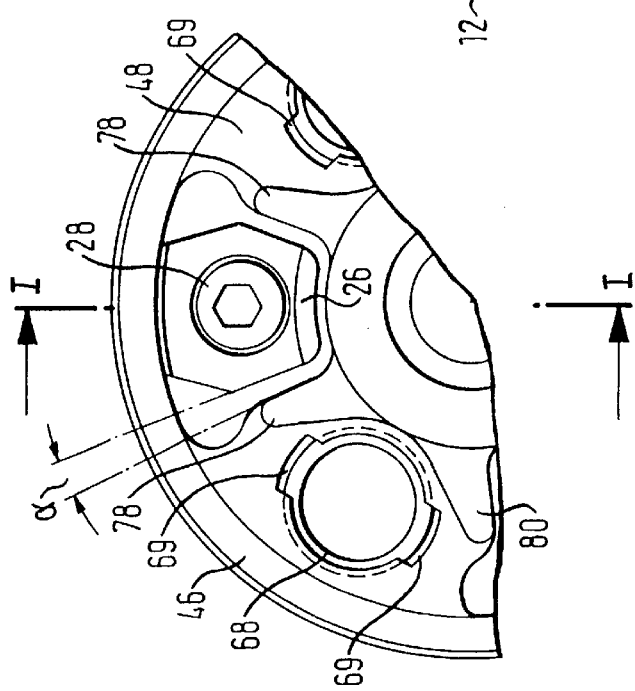
FIG. 2 is the front end view in the direction of arrow II of FIG. 1.

In the shaft coupling according to FIGS. 1 and 2 the torsional vibration suppressor 40 forms a structural unit together with the second flange 20, while the centering device 50 is a separate component which is inserted subsequently. The second flange 20 according to FIGS. 1 and 2 is divided into a primary portion 70 and a coaxial secondary portion 72. The primary portion 70 is designed for attachment to the associated shaft 22, for instance by a friction weld 24, and comprises the suppressor collar 42 for connection of the rubber spring suspension system 48 by vulcanization as well as the seat 54 into which the centering collar 52 is pressed. The secondary portion 72, on the other hand, is formed with a collar 74 connected by a vulcanized rubber spring suspension system 76 to a collar 78 of the primary portion 70, which collar presents the seat 54. The mutually opposed surfaces of the two collars 74 and 78 and the rubber spring suspension system 76 adhering to them, preferably by vulcanization, are spherically shaped so that they permit relatively great angular deflections of the two shafts 12 and 22 with respect to each other. The secondary portion 72 comprises the three arms 26, a bushing 32 each of the flexible disc 30 being fastened to each one of them by a corresponding threaded bolt 28.

The rubber spring suspension system 76 furthermore allows certain relative rotations of the primary portion 70 with respect to the secondary portion 72 and thus serves to decouple vibrations of small amplitude in the power train at low torques. Each one of the arms 26 with which the secondary portion 72 is formed is received between two stops 80 formed at the primary portion 70 so as to project radially outwardly like a fork. Hereby the relative rotations which are possible between the primary portion 70 and the secondary portion 72 are limited to an angle a of 1 to 2°, for instance. The rubber spring suspension system 76 permits a flexible disc 30 to be used which is of relatively simple design of the kind illustrated in FIG. 1 with which the bushings 32 are embedded directly in the rubber 38.

The shaft coupling according to FIGS. 3 and 4 differs from the one shown in FIGS. 1 and 2 by the fact that the flange 20, which again is divided into a primary portion 70 and a secondary portion 72 with a rubber spring suspension system 76 secured to both by vulcanizing, forms one structural unit not only with the torsional vibration suppressor 40 but also with the centering 50. According to FIGS. 3 and 4 the collars 74 and 78 and the rubber spring suspension system 76 are cylindrical. Yet they might also be spherically arched, as shown in FIGS. 1 and 2.

What is claimed is:

1. A shaft coupling, comprising:

first and second flanges adapted to be secured to first and second shafts, respectively;

a flexible disc disposed between the two flanges and fixed to each of the flanges;

a torsional vibration suppressor comprising a suppressor collar rigidly connected to the second flange, a gyrating mass, and a first rubber spring suspension system adhering to the suppressor collar and the gyrating mass; and a centering device comprising a centering collar rigidly connected to the second flange, a centering body rigidly connected to the first flange, and a second rubber spring suspension system adhering to the centering collar, wherein the second flange is divided into a primary portion and a secondary portion which are interconnected by a third rubber spring suspension system, the primary portion is adapted to be secured to the second shaft and comprises at least one of the suppressor collar and centering collar, and the secondary portion is connected through the flexible disc to the first flange.

2. The shaft coupling as claimed in claim 1, wherein the primary portion comprises a primary collar and the secondary portion comprises a secondary collar and the third rubber spring suspension system lies between these primary and secondary collars.

3. The shaft coupling as claimed in claim 2, wherein the primary and secondary collars and the third rubber spring suspension system located between them are cylindrical.

4. The shaft coupling as claimed in claim 2, wherein the primary and secondary collars and the third rubber spring suspension system located between them are spherically arched.

5. A shaft coupling, comprising:

first and second flanges adapted to be secured to first and second shafts, respectively;

a flexible disc disposed between the two flanges and fixed to each of the flanges;

a torsional vibration suppressor comprising a suppressor collar rigidly connected to the second flange, a gyrating mass, and a first rubber spring suspension system adhering to the suppressor collar and the gyrating mass; and a centering device comprising a centering collar rigidly connected to the second flange, a centering body rigidly connected to the first flange, and a second rubber spring suspension system adhering to the centering collar, wherein the second flange is divided into a primary portion and a secondary portion which are interconnected by a third rubber spring suspension system, the primary portion is adapted to be secured to the second shaft and comprises the suppressor collar and the centering collar, and the secondary portion is connected through the flexible disc to the first flange.

* * * * *

UNITED STATES PATENT AND TRADEMARK OFFICE
CERTIFICATE OF CORRECTION

PATENT NO. : 6,068.555
DATED : May 30, 2000
INVENTOR(S) : Rainer ANDRA et al.

It is certified that error appears in the above-identified patent and that said Letters Patent is hereby corrected as shown below:

Column 1 Line 7 after "coupling" and before the period insert --for a motor vehicle power train--.

Column 2 Line 4 after "rubber" delete --34--.

Column 2 Line 5 after "bushing" delete --36--.

Column 3 Line 10 "angle a" should read --angle α--.

Signed and Sealed this

Third Day of April, 2001

*Attest:*

NICHOLAS P. GODICI

*Attesting Officer*     *Acting Director of the United States Patent and Trademark Office*